(12) United States Patent
Bogot et al.

(10) Patent No.: US 8,181,255 B2
(45) Date of Patent: May 15, 2012

(54) DIGITAL RIGHTS MANAGEMENT SYSTEM

(75) Inventors: Carmi Bogot, Maaleh Adumim (IL); Hillel Solow, Beit Shemesh (IL)

(73) Assignee: NDS Limited, Staines, Middlesex (GB)

( * ) Notice: Subject to any disclaimer, the term of this patent is extended or adjusted under 35 U.S.C. 154(b) by 1494 days.

(21) Appl. No.: 10/592,650

(22) PCT Filed: Jun. 2, 2005

(86) PCT No.: PCT/IL2005/000580
§ 371 (c)(1),
(2), (4) Date: Nov. 16, 2006

(87) PCT Pub. No.: WO2005/125072
PCT Pub. Date: Dec. 29, 2005

(65) Prior Publication Data
US 2008/0052781 A1 Feb. 28, 2008

Related U.S. Application Data

(60) Provisional application No. 60/582,114, filed on Jun. 22, 2004.

(51) Int. Cl.
*G06F 11/30* (2006.01)
*G06F 12/14* (2006.01)
*G06F 7/04* (2006.01)
*G06F 17/30* (2006.01)

(52) U.S. Cl. .......................................... 726/26; 713/193

(58) Field of Classification Search .................. None
See application file for complete search history.

(56) References Cited

U.S. PATENT DOCUMENTS

| 5,282,249 | A | 1/1994 | Cohen et al. |
| 5,481,609 | A | 1/1996 | Cohen et al. |
| 6,389,540 | B1 * | 5/2002 | Scheifler et al. ................. 726/21 |
| 6,880,081 | B1 | 4/2005 | Itkis |
| 7,020,645 | B2 * | 3/2006 | Bisbee et al. ........................... 1/1 |
| 7,171,558 | B1 * | 1/2007 | Mourad et al. ................. 713/168 |

(Continued)

FOREIGN PATENT DOCUMENTS

EP 1 191 422 A2 3/2002

(Continued)

OTHER PUBLICATIONS

Open Mobile Alliance-Digital Rights Management Short Paper, Dec. 2003; available at www.openmobilealliance.com/docs/DRM%20sHORT%20Paper%20DEC%202003%20.pdf.

(Continued)

*Primary Examiner* — Nathan Flynn
*Assistant Examiner* — Trang Doan
(74) *Attorney, Agent, or Firm* — Husch Blackwell LLP

(57) ABSTRACT

A digital rights management system including a controlled content disk to store content in an encrypted format, and a processor to run a plurality of applications and a secure device driver thereon, the processor being operationally associated with the controlled content disk, the applications being unable to decrypt content from the encrypted format, the secure device driver having a receiving module to receive a request from one of the applications to access the content, a validation module to validate the request based upon a recognized access pattern to the content by the one application, and a transport module to transfer the content from the controlled content disk to the one application, contingent upon a positive result of the validating of the validation module. Related apparatus and methods are also described.

18 Claims, 3 Drawing Sheets

U.S. PATENT DOCUMENTS

| | | | |
|---|---|---|---|
| 7,330,981 B2 * | 2/2008 | Willman | 713/193 |
| 7,401,141 B2 * | 7/2008 | Carusi et al. | 709/224 |
| 7,503,062 B2 * | 3/2009 | Wong et al. | 726/2 |
| 7,529,929 B2 * | 5/2009 | Asokan et al. | 713/161 |
| 7,809,679 B2 * | 10/2010 | Nixon et al. | 707/609 |
| 2002/0099837 A1 * | 7/2002 | Oe et al. | 709/229 |
| 2002/0161996 A1 * | 10/2002 | Koved et al. | 713/150 |
| 2003/0120667 A1 * | 6/2003 | Jeong et al. | 707/100 |
| 2003/0140243 A1 * | 7/2003 | Nusser et al. | 713/200 |
| 2003/0159070 A1 * | 8/2003 | Mayer et al. | 713/201 |
| 2003/0217155 A1 * | 11/2003 | Greck et al. | 709/227 |
| 2003/0226012 A1 | 12/2003 | Asokan et al. | |
| 2004/0039704 A1 | 2/2004 | Gilliam et al. | |
| 2004/0172562 A1 * | 9/2004 | Berger et al. | 713/202 |
| 2005/0070248 A1 | 3/2005 | Gaur | |
| 2005/0076237 A1 * | 4/2005 | Cohen et al. | 713/201 |
| 2005/0216519 A1 * | 9/2005 | Mayo et al. | 707/200 |

FOREIGN PATENT DOCUMENTS

| | | |
|---|---|---|
| GB | 2 119 978 A | 11/1983 |
| GB | 2 353 682 A | 2/2001 |

OTHER PUBLICATIONS

Dec. 11, 2009 Office Communication in connection with EP 05 74 7258.1 (3 pages).

Jul. 5, 2011 Office Communication in connection with prosecution of EP 05 747 258.1.

* cited by examiner

DIGITAL RIGHTS MANAGEMENT SYSTEM

RELATED APPLICATION INFORMATION

The present application is a 35 USC §371 application of PCT/IL2005/000580, filed on 2 Jun. 2005 and entitled "Digital Rights Management System", which was published on 29 Dec. 2005 in the English language with International Publication Number WO 2005/125072 A2, and which relies for priority on U.S. Provisional Patent Application Ser. No. 60/582,114 filed 22 Jun. 2004, which is hereby incorporated by reference.

FIELD OF THE INVENTION

The present invention relates to digital rights management (DRM) systems and in particular to DRM systems useful in conjunction with mobile telephony systems.

BACKGROUND OF THE INVENTION

Digital rights management (DRM) systems are well-known in the art. A description of one example of such a system is found on the World Wide Web at:
www.openmobilealliance.com/docs/
DRM%20Short%20Paper%20DEC%202003%20.pdf In a typical DRM environment, a content server provides content to a DRM server. The DRM server is typically also provided, from the content server or from another appropriate source, with access rules indicating which entities are to be enabled to access the content, and with what rights; typical examples of rights include the following non-limiting list: no access; render only; render only a certain number of times; free preview, copy once; and copy many.

The DRM server typically outputs scrambled or encrypted content (termed herein "scrambled content"), scrambled or encrypted in accordance with any appropriate scrambling or encryption scheme, such as, for example, AES or triple-DES. The terms "scrambled" and "encrypted", in all their grammatical forms, are used interchangeably throughout the present specification to refer to any appropriate form of scrambling or encrypting, as is well-known in the art.

The DRM server typically outputs a key for descrambling or decrypting the content. As is well-known in the art, such a key may be supplied "as is" or in, for example, any of the following forms: encrypted with one or more group keys, as is well-known in the art; as an entitlement control message (ECM) for input to a one-way function at a receiver of the ECM in order to produce the key; as an encrypted ECM for decryption at a receiver of the ECM (such as a mobile device), it being appreciated that the ECM form is particularly useful in broadcast systems such as the well-known DVB-H; as an encrypted key within a rights object.

Typical methods useful in handling such keys are described, for example, in the following patents and published patent applications, the disclosures of which are hereby incorporated herein by reference: U.S. Pat. Nos. 5,282,249 and 5,481,609 to Cohen et al; and GB Published Patent Application 2353682 of NDS Limited and corresponding U.S. patent application Ser. No. 09/502,867 of Itkis.

Additionally, the DRM server typically outputs one or more tamper resistant or tamper proof rights objects, each rights object including appropriate information implementing one or more of the access rules as described above, for interpretation by a DRM agent associated with the receiver of the content.

In typical digital rights management systems, content is sent to a content receiver and stored in secured form. When content is to be accessed (for example, rendered), a secure application interprets one or more rights objects associated with the device or user who has requested a particular type of access (rendering in the present example). If rendering by the requestor is permitted, the secure application determines the content key (using an appropriate method based on the manner in which the content key is encrypted or otherwise protected, as described above) and provides the content as requested (in the present example, renders the content).

Digital rights management systems useful in connection with mobile telephony typically face certain challenges because of the nature of the mobile telephone handset environment, the mobile telephone handset being the receiver in the case of a mobile telephony system.

In typical presently commercially available DRM systems, because content is stored in scrambled form, applications which are to access the content must be customized in order to provide the functions described above. One example of a commercially available DRM system for mobile telephone is the Mobile DRM System, available from NDS Limited, One London Road, Staines, Middlesex TW18 4EX, United Kingdom.

A standard for mobile DRM systems is presently being developed by the Open Mobile Alliance; information about the Open Mobile Alliance is available via the Internet on the World Wide Web, at www.openmobilealliance.org. It is believed that, in some of the current implementations, in Open Mobile Alliance systems, and in other systems, content is descrambled and stored "in the clear" in a temporary area so that it can be played by a standard application.

The disclosures of all references mentioned above and throughout the present specification, as well as the disclosures of all references mentioned in those references, are hereby incorporated herein by reference.

SUMMARY OF THE INVENTION

The present invention seeks to provide an improved digital rights management system. In particular, the present invention, in preferred embodiments thereof, teaches an improved digital rights management system for a mobile telephone including applications running thereon that cannot decrypt encrypted data.

The inventors of the present invention believe that it is often difficult or undesirable, whether for technical or for business reasons or both, to provide a secure application for accessing content stored on a mobile telephone handset. The difficulty arises because of the necessity of customizing each application as described above; generally, each application must be customized differently for different mobile handsets.

The inventors of the present invention believe that it would be preferable to use a standard, commercially available application, and to provide additional elements to complete a secure DRM environment on the handset; in such an environment, it should be possible to avoid storing content "in the clear". Furthermore, in such an environment, the extra time, storage, and CPU usage that would otherwise be needed to produce a temporary copy, as described above, can be saved.

The present invention, in preferred embodiments thereof, seeks to provide such a solution by adapting a device driver to control access to encrypted data by validating application requests to the data. Once validated, the data is preferably decrypted and transferred by streaming or on a block-by-block basis to the requesting application so that the data does not need to be stored in a decrypted format on the disk even temporarily. The requesting application is typically validated using techniques, such as, application name or hash function validation. In accordance with a most preferred embodiment of the present invention, the data is validated based on a behavior of the application, for example, but not limited to, intended usage of the data or a recognized access pattern to the data by the requesting application. In accordance with an alternative embodiment of the present invention, the data is validated based on whether the data is suitable for running on the requesting application.

There is thus provided in accordance with a preferred embodiment of the present invention a digital rights management system for a mobile telephone, including a controlled content disk to store content in an encrypted format, and a mobile telephone processor to run a plurality of mobile telephone applications and a secure device driver thereon, the mobile telephone processor being operationally associated with the controlled content disk, the mobile telephone applications being unable to decrypt content from the encrypted format, the secure device driver having a receiving module to receive a request from one of the mobile telephone applications to access the content, a validation module to validate the request, and a transport module to substantially directly transfer the content to the one mobile telephone application, contingent upon a positive result of the validating of the validation module.

Further in accordance with a preferred embodiment of the present invention the controlled content disk includes a secure section to store data therein such that the data stored in the secure section is unavailable to the mobile telephone applications.

Still further in accordance with a preferred embodiment of the present invention the secure section is adapted such that the data stored in the secure section is hidden from the mobile telephone applications.

Additionally in accordance with a preferred embodiment of the present invention the data of the secure section includes rights objects.

Moreover in accordance with a preferred embodiment of the present invention the data of the secure section includes at least one of codes, keys and identification data.

Further in accordance with a preferred embodiment of the present invention the data of the secure section includes digital rights management database information.

Still further in accordance with a preferred embodiment of the present invention the validation module validates the request in accordance with at least one right of the one mobile telephone application.

Additionally in accordance with a preferred embodiment of the present invention the validation module validates the request based on a name of the one mobile telephone application.

Moreover in accordance with a preferred embodiment of the present invention the validation module validates the request based on a secure wrapper of the one mobile telephone application, the secure wrapper including a digitally signed hash of the one mobile telephone application.

Further in accordance with a preferred embodiment of the present invention the validation module is adapted to validate the request based upon a behavior of the one mobile telephone application.

Still further in accordance with a preferred embodiment of the present invention the transport module is adapted to transfer the content solely in an encrypted format to the one mobile telephone application upon a negative result of the validating of the validation module.

Additionally in accordance with a preferred embodiment of the present invention the validation module includes a differentiation section to differentiate between a plurality of request types of the one mobile telephone application, such that the validation module validates the request based upon the request type of the request.

Moreover in accordance with a preferred embodiment of the present invention the request types include at least one of access for play and access for sending.

Further in accordance with a preferred embodiment of the present invention the differentiation section determines the request type by examining the access characteristics of the one mobile telephone application.

Still further in accordance with a preferred embodiment of the present invention the differentiation section determines the request type by examining the stack of the one mobile telephone application.

Additionally in accordance with a preferred embodiment of the present invention the transport module includes a decryption section to decrypt the content, such that decrypted content is transferred to the one mobile telephone application.

Moreover in accordance with a preferred embodiment of the present invention the behavior includes an access pattern of the one mobile telephone application.

Further in accordance with a preferred embodiment of the present invention the access pattern is based on an order in which the one mobile telephone application accesses different parts of the content.

Still further in accordance with a preferred embodiment of the present invention the access pattern is based on the one mobile telephone application never legitimately accessing a part of a file including the content.

Additionally in accordance with a preferred embodiment of the present invention the validation module is adapted to validate the request based upon whether the one mobile telephone application is able to run the content.

There is also provided in accordance with another preferred embodiment of the present invention a system for managing access by at least one application to content stored in a controlled content disk, the system including a receiving module to receive a request from the application to access the content, a validation module to validate the request based upon a behavior of the application, and a transport module to transfer the content, from the controlled content disk to the application, contingent upon a positive result of the validating of the validation module.

Moreover in accordance with a preferred embodiment of the present invention the transport module is adapted to transfer the content solely in an encrypted format to the application upon a negative result of the validating of the validation module.

Further in accordance with a preferred embodiment of the present invention the validation module includes a differentiation section to differentiate between a plurality of request types of the application, such that the validation module validates the request based upon a behavior of the application for the request type of the request.

Still further in accordance with a preferred embodiment of the present invention the request types include at least one of access for play and access for sending.

Additionally in accordance with a preferred embodiment of the present invention the differentiation section determines the request type by examining the access characteristics of the application.

Moreover in accordance with a preferred embodiment of the present invention the differentiation section determines the request type by examining the stack of the application.

Further in accordance with a preferred embodiment of the present invention the transport module includes a decryption section to decrypt the content, such that decrypted content is transferred to the application.

Still further in accordance with a preferred embodiment of the present invention the behavior includes an access pattern of the application.

Additionally in accordance with a preferred embodiment of the present invention the access pattern is based on an order in which the application accesses different parts of the content.

Moreover in accordance with a preferred embodiment of the present invention the access pattern is based on the application never legitimately accessing a part of a file including the content.

There is also provided in accordance with still another preferred embodiment of the present invention a system for managing access by at least one application to content stored in a controlled content disk, the system including a receiving module to receive a request from the application to access the content, a validation module to validate the request based upon whether the one application is able to run the content, and a transport module to transfer the content, from the controlled content disk to the application, contingent upon a positive result of the validating of the validation module.

Further in accordance with a preferred embodiment of the present invention the transport module is adapted to transfer the content solely in an encrypted format to the application upon a negative result of the validating of the validation module.

Still further in accordance with a preferred embodiment of the present invention the transport module includes a decryption section to decrypt the content, such that decrypted content is transferred to the application.

There is also provided in accordance with still another preferred embodiment of the present invention a method for managing rights to content by mobile telephone applications of a mobile telephone, the content being stored in an encrypted format, the mobile telephone applications being unable to decrypt content from the encrypted format, the method including receiving a request from one of the mobile telephone applications to access the content, validating the request, and substantially directly transferring the content to the one mobile telephone application, contingent upon a positive result of the validating.

There is also provided in accordance with still another preferred embodiment of the present invention a method for managing access by at least one application to content stored in a controlled content disk, the method including receiving a request from the application to access the content, validating the request based upon a behavior of the application, and transferring the content from the controlled content disk to the application, contingent upon a positive result of the validating.

There is also provided in accordance with still another preferred embodiment of the present invention a method for managing access by at least one application to content stored in a controlled content disk, the method including receiving a request from the application to access the content, validating the request based upon whether the content is suitable for running by the one application, and transferring the content, from the controlled content disk to the application, contingent upon a positive result of the validating of the validation module.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Persons skilled in the art will appreciate that, throughout the present application, a mobile telephone is used by way of example only, and that the present invention is not limited to a particular type of host device, but rather includes any suitable device. Additionally, persons skilled in the art will appreciate that, throughout the present application, a mobile telephone application is used by way of example only, and that the present invention is not limited to a particular type of application, but rather includes any suitable application.

Figure 1:
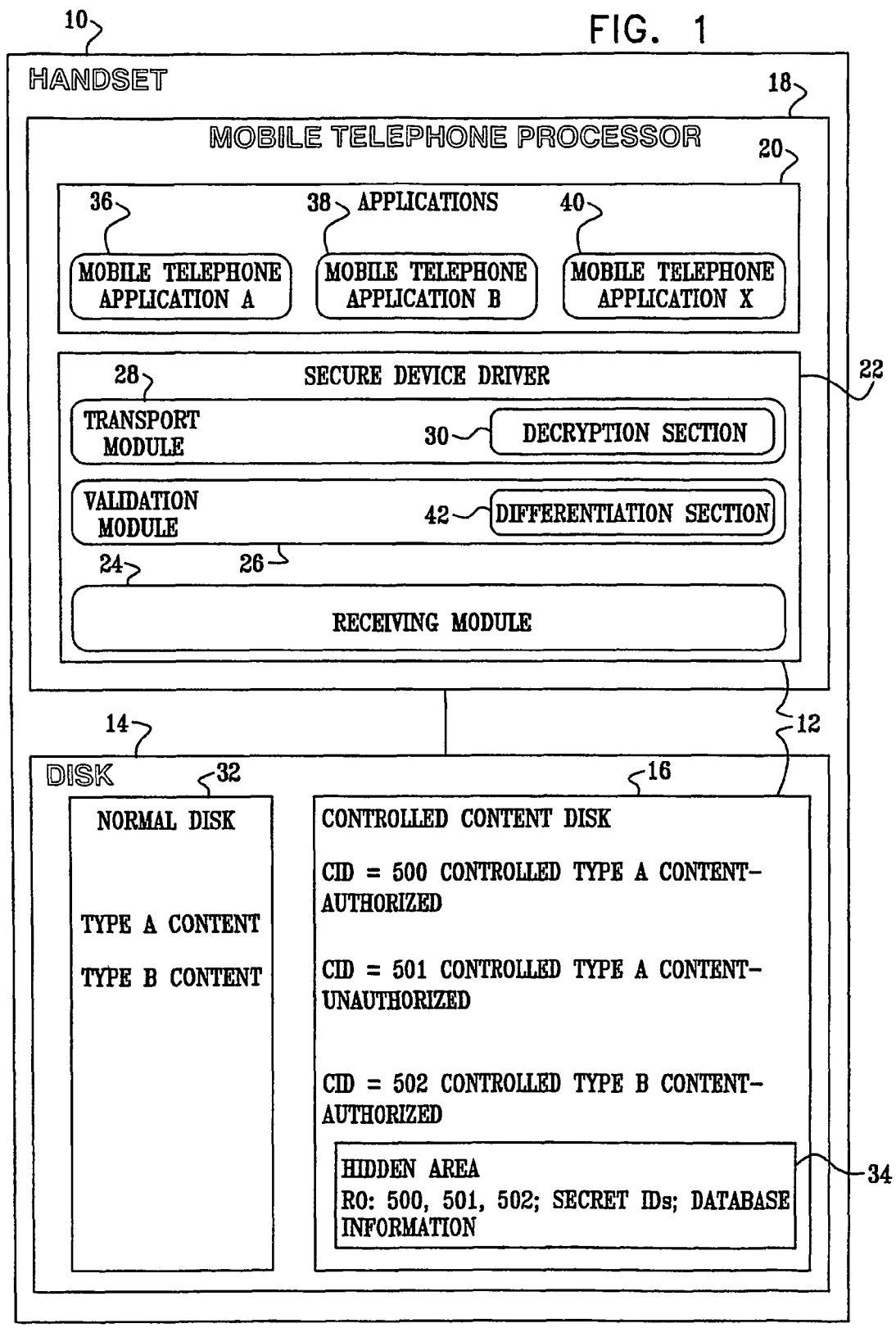
FIG. 1 is a simplified block diagram illustration of a mobile telephone handset incorporating a digital rights management (DRM) system, constructed and operative in accordance with a preferred embodiment of the present invention.

Reference is now made to FIG. 1, which is a simplified block diagram illustration of a mobile telephone handset 10 incorporating a digital rights management (DRM) system 12, constructed and operative in accordance with a preferred embodiment of the present invention. The mobile telephone handset 10 typically includes a disk 14 for storage of content and other data thereon. The disk 14 preferably includes a normal disk 32 for storing uncontrolled content.

The mobile telephone handset 10 also generally includes conventional components (not shown) well-known in the art of mobile telephony.

The DRM system 12 preferably includes a controlled content disk 16 to store content in an encrypted format, using any appropriate encryption method, and a mobile telephone processor 18. The mobile telephone processor 18 is generally adapted to run a plurality of mobile telephone applications 20 and a secure device driver 22 thereon. The mobile telephone processor 18 is typically operationally associated with the controlled content disk 16 by being electrically connected thereto. The mobile telephone applications 20 are generally unable to decrypt content from the encrypted format. In the example of FIG. 1, the mobile telephone applications 20 include a type A player 36, a type B player 38, and a type X player 40, which are typically implemented in software.

It will be appreciated that, in FIG. 1, the type A player 36, the type B player 38, and the type X player 40 are shown by way of example only; in practice, more or fewer mobile telephone applications 20, including applications which are not players (such as, for example, a file manager) may be used. By way of example only and without limiting the generality of the present invention, the type A player 36 may comprise an authorized JPEG player, the type B player 38 may comprise an authorized MPEG-4 player, and the type X player 40 may comprise a non-authorized player of any appropriate type.

The normal disk 32 is shown in FIG. 1, by way of example only, as storing type A content and type B content. The content stored in the normal disk 32 is preferably not controlled by the secure device driver 22. The uncontrolled content is preferably made available to any application that requests access thereto. For example, the type A player 36, the type B player 38, and the type X player 40 are all able to access the type B content stored in the normal disk 32.

The controlled content disk 16 is shown in FIG. 1, by way of example only, as storing the following content:

1. Content having content ID (CID) 500, which comprises controlled type A content whose use is authorized.
2. Content having content ID (CID) 501, which comprises controlled type A content whose use is unauthorized.
3. Content having content ID (CID) 502, which comprises controlled type B content whose use is authorized.

The controlled content disk 16 typically includes a secure section to store data therein such that the data stored in the secure section is unavailable to the mobile telephone applications 20. The data of the secure section is typically hidden from the mobile telephone applications 20. Therefore, the secure section is generally called a hidden area 34 of the controlled content disk 16.

The hidden area 34 generally stores rights objects (RO) for CID 500, CID 501, and CID 502, and secret information to be stored (codes, keys for decrypting content stored in the controlled content disk 16, or identification data such as local phone information (for example, but not limited to the International Mobile Equipment Identity (IMEI) number or Mobile Subscriber Identity Number (MSIDN)), which are well known in the art, a secure random seed received from the secure device driver 22 during sign-up, information used to verify certificates, keys used to protect content, keys used to protect and/or verify rights information and/or rights objects, and sensitive public key infrastructure (PKI) information), and any needed DRM database information (such as, for example, a database recording instances of access to content, used to enforce constraints and other local secure DRM functions, such as implementing a right to access or to render a particular content item only a certain number of times).

Persons skilled in the art will appreciate that the normal disk 32, the controlled content disk 16, and the hidden area 34 are typically implemented in a combination of hardware (such as, for example, flash memory) and software (such as, for example, the secure device driver 22). The controlled content disk 16 is typically part of the disk 14 allocated by the secure device driver 22. In a case where the disk 14 is provided using removable flash memory, persons skilled in the art will appreciate that the secure device driver 22 is typically provided when removable flash memory is purchased, so that provision of the secure device driver 22 would be especially easy in such a case.

The secure device driver 22 preferably includes a receiving module 24, a validation module 26 and a transport module 28.

The receiving module 24 generally receives requests from the mobile telephone applications 20 to access the content stored in the controlled content disk 16.

The validation module 26 preferably validates the request. Only the mobile telephone applications 20 which are authorized to access content are typically allowed to have any access at all to content which is stored in the controlled content disk 16. In some cases, the validation module 26 validates the request based on a name of the requesting mobile telephone application 20. In other cases, valid applications may be supplied with a secure "wrapper", including an appropriate digitally signed hash of the application (using any appropriate hashing and digital signature techniques, as are well known in the art); the validation module 26 validates the request based on the secure wrapper of the requesting mobile telephone applications 20 by verifying the signature and the hash in order to more securely verify the identity of the application.

Additionally or alternatively, the validation module 26 validates the request in accordance with rights objects associated with the mobile telephone applications 20, as is well-known in the art of digital rights management.

Other validation methods are described with reference to FIGS. 2 to 5. It will be appreciated by those ordinarily skilled in the art that the validation methods of FIGS. 1 to 5 can be used separately or in any suitable combination thereof.

The transport module 28 preferably includes a decryption section 30 to decrypt the requested content, such that decrypted content is transferred to the requesting mobile telephone application 20. The transport module 28 is generally adapted to substantially directly-transfer the decrypted ("in the clear") content to the requesting mobile telephone application 20, contingent upon a positive result of the validating of the validation module 26.

The term "substantially directly" used in the claims and specification is defined as transferring the decrypted ("in the clear") content from the controlled content disk 16 to the requesting mobile telephone application 20, without storing the entire requested decrypted content even in a temporary location at the same time. Direct transfer of the content is typically performed by, for example, but not limited to streaming or a block-by-block transfer of the decrypted content to the requesting mobile telephone application 20. It should be noted that even though it is preferable for the content not to be stored in a decrypted format even temporarily, some of the content may be stored temporarily in the input buffer of the mobile telephone application 20 while the content is waiting to be played by the mobile telephone application 20. Careful control by the mobile telephone processor 18 is generally required to ensure that the input buffer of the requesting mobile telephone application 20 is minimized. Preferably, the content is never stored even partially on the disk 14.

Upon a negative result of the validating of the validation module 26, there are typically two options. The first option is for the secure device driver 22 to deny access to the requested content. The second option is for the transport module 28 to transfer the content solely in an encrypted format to the requesting mobile telephone application 20.

Persons skilled in the art will appreciate that, based on the above-described attributes of FIG. 1, many desirable security features are achieved. If, for example, a file manager (not being an authorized application), attempts to perform a directory operation on the controlled content disk 16, the result is that the controlled content disk 16 generally appears to be empty. If, for example, a player application performs a directory operation on the controlled content disk 16, the preferable result is that only content that the player application is allowed to see in accordance with the rights objects will be shown. Therefore, in a case where the handset 10 is authorized and the content is being accessed by an authorized mobile telephone application 20, the content generally appears to be "normal" unencrypted content.

Figure 2:
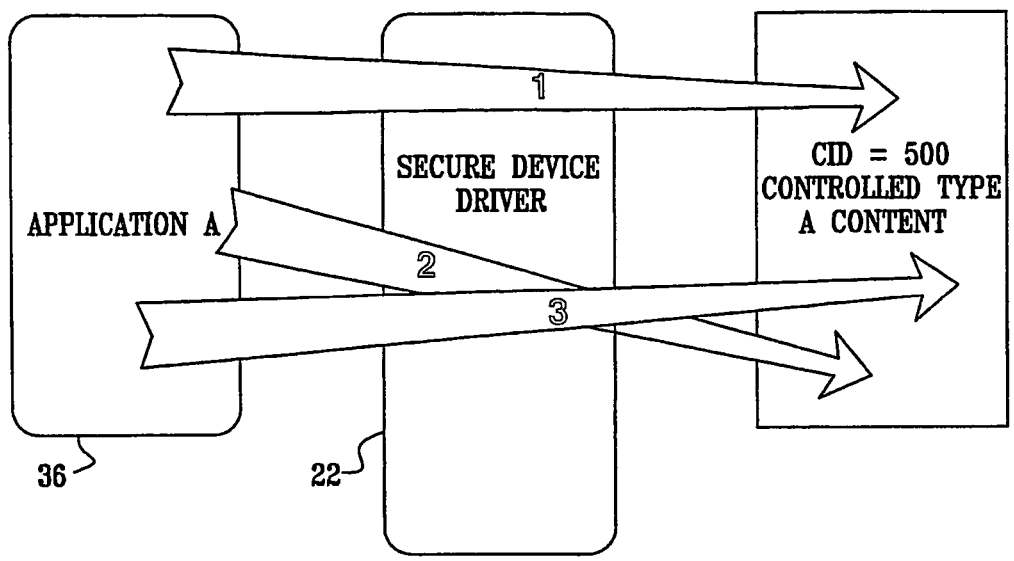
FIG. 2 is a simplified block diagram illustration of the typical access behavior of an application running on the system of FIG. 1.
Figure 3:
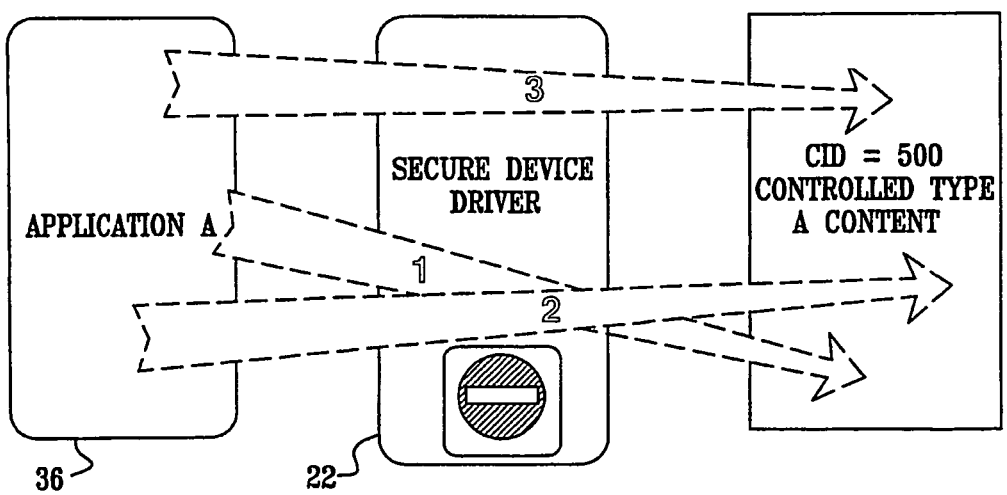
FIG. 3 is a simplified block diagram of the application of FIG. 2 being denied access to content.

Reference is now also made to FIGS. 2 and 3. FIG. 2 is a simplified block diagram illustration of the typical access behavior of the type A player 36 running on the DRM system 12 of FIG. 1. FIG. 3 is a simplified block diagram of the type A player 36 of FIG. 2 being denied access to the content.

Alternatively or additionally, whether or not an application is valid can be determined by application behavior. Therefore, in accordance with a most preferred embodiment of the present invention, the validation module 26 is adapted to validate the request for the controlled content based upon a behavior of the requesting mobile telephone application 20.

The behavior typically includes an access pattern of the requesting mobile telephone application 20, for example, but not limited to the order in which the requesting mobile telephone application 20 generally accesses different parts of the content.

For example, the access pattern might be based on the determination that a valid mobile telephone application 20 never legitimately accesses some part of a file containing the content.

Another example, shown in FIG. 2, is where it is determined that the type A player 36 always reads the beginning of the file (arrow 1), then the end of the file (arrow 2), and then reads back to the beginning of the file (arrow 3). Therefore, when the type A player 36 attempts to access the content in a different order, for example by first by reading the end of the file (arrow 1), then reading back to the middle of the file (arrow 2) and then reading back to the beginning of the file (arrow3), the secure device driver 22 denies the type A player 36 access to the controlled content.

Persons skilled in the art will appreciate that many other examples are possible.

Further, it is possible for the indicated type of behavioral analysis to be applied not only to different applications, but even to one application making different requests. The validation module 26 includes a differentiation section 42 to differentiate between different request types (for example, but not limited to access for play and access for sending) of the same mobile telephone application 20, such that the validation module 26 typically validates the request based upon the request type of the request.

The differentiation section 42 generally determines the request type by examining the access characteristics of the requesting mobile telephone application 20 or by examining the stack of the requesting mobile telephone application 20.

For example, say the requesting mobile telephone application 20 is a video player but also has in the menu "Send via infrared" for video files. To support superdistribution, differentiation section 42 differentiates between access for play and access for sending, so that for play, the secure device driver 22 transfers decrypted data, and for sending, the secure device driver 22 transfers encrypted data.

Figure 4:
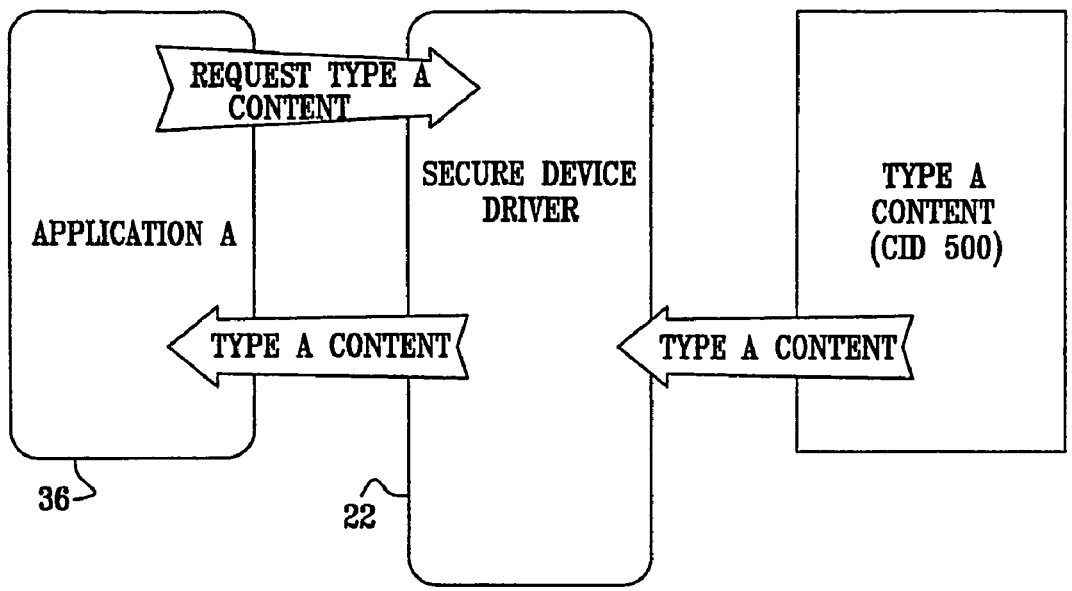
FIG. 4 is a simplified block diagram of a type A application, accessing type A authorized content, running on the system of FIG. 1.
Figure 5:
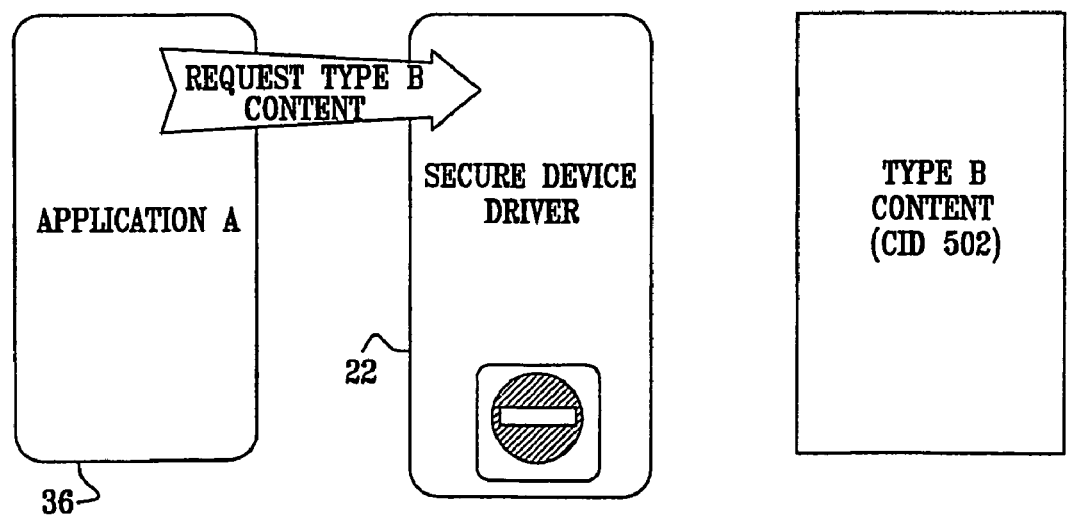
FIG. 5 is a simplified block diagram of the type A application of FIG. 4 being denied access to type B content.

Reference is now made to FIGS. 4 and 5. Reference is also made to FIG. 1. FIG. 4 is a simplified block diagram of the type A player 36, accessing type A content (CID 500). FIG. 5 is a simplified block diagram of the type A player 36 of FIG. 4 being denied access to the type B content (CID 502).

In accordance with an alternative embodiment of the present invention, the validation module 26 is adapted to validate the request of the requesting mobile telephone application 20 based upon whether the requesting mobile telephone application 20 is able to run the content so that the mobile telephone applications 20 are only supplied with content which is appropriate for the requesting application.

In the example of FIG. 4, the type A player 36 is able to run type A content (CID 500), and the type A player 36 is generally authorized for the CID 500 content, therefore the secure device driver 22 transfers decrypted content directly to the type A player 36.

However, in the example of FIG. 5, the type A player 36 is preferably not in a position to request access to the type B content (CID 502), since the content with CID 502 is type B content, and the secure device driver 22 preferably does not even allow the type A player 36 to be "aware" of the existence of the CID 502 content. However, should the type A player 36 request such access, the CID 502 content is generally not supplied.

Reference is again made to FIG. 1. By way of example, the type A player 36 requests access to the content with CID 501. While the CID 501 content is of type A, the type A player 36 is not authorized for the CID 501 content; the CID 501 content is therefore generally not supplied.

Persons skilled in the art will appreciate, based on the above examples, that the type B player 38 is preferably not "aware" of the CID 500 and CID 501 content, but is allowed access to the CID 502 content. Furthermore, the type X player 40, which does not comprise an authorized application, is preferably not "aware" of any content stored in the controlled content disk 16, but if the type X player 40 somehow requests access to such content, the content is generally not supplied.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A digital rights management system comprising:
    a controlled content disk to store content in an encrypted format; and
    a processor to run a plurality of applications and a secure device driver thereon, the processor being operationally associated with the controlled content disk, the applications being unable to decrypt content from the encrypted format, the secure device driver having:
        a receiving module to receive a request from one of the applications to access the content;
        a validation module to validate the request based upon a recognized access pattern of behavior by which the one application accesses a file in which the content is embodied, the access pattern being based on an order in which the one application accesses different parts of the content; and
        a transport module to transfer the content, from the controlled content disk to the one application, contingent upon a positive result of the validating of the validation module.

2. The system according to claim 1, wherein the controlled content disk includes a secure section to store data therein such that the data stored in the secure section is unavailable to the applications.

3. The system according to claim 2, wherein the secure section is operative such that the data stored in the secure section is hidden from the applications.

4. The system according to claim 2, wherein the data of the secure section includes rights objects.

5. The system according to claim 2, wherein the data of the secure section includes at least one of codes, keys and identification data.

6. The system according to claim 2, wherein the data of the secure section includes digital rights management database information.

7. The system according to claim 2, wherein the validation module validates the request in accordance with at least one right of the one application.

8. The system according to claim 1, wherein the validation module validates the request based on a name of the one application.

9. The system according to claim 1, wherein the validation module validates the request based on a secure wrapper of the one application, the secure wrapper including a digitally signed hash of the one application.

10. The system according to claim 1, wherein the validation module includes a differentiation section to differentiate between a plurality of request types of the one application, such that the validation module validates the request based upon the request type of the request.

11. The system according to claim 10, wherein the request types include at least one of access for play and access for sending.

12. The system according to claim 10, wherein the differentiation section determines the request type by examining the access characteristics of the one application.

13. The system according to claim 10, wherein the differentiation section determines the request type by examining the stack of the one application.

14. The system according to claim 1, wherein the transport module includes a decryption section to decrypt the content, such that decrypted content is transferred to the one application.

15. The system according to claim 1, wherein the access pattern is based on the one application never legitimately accessing a part of the file including the content.

16. The system according to claim 1, wherein the validation module is operative to validate the request based upon whether the one application is able to run the content.

17. A method for managing access by at least one application to content stored in a controlled content disk, the method comprising:

receiving a request, by a secure device driver, from one application which is running in a processor, to access the content stored in the controlled content disk;

validating the request, by the secure device driver, based upon a recognized access pattern of behavior by which the one application accesses a file in which the content is embodied, the access pattern being based on an order in which the one application accesses different parts of the content; and transferring the content, by the secure device driver, from the controlled content disk to the one application, contingent upon a positive result of the validating.

18. A digital rights management system comprising:

means for storing content in an encrypted format; and means for running a plurality of applications, the applications being unable to decrypt content from the encrypted format;

means for receiving a request from one of the applications to access the content;

means for validating the request based upon a recognized access pattern of behavior by which the one application accesses a file in which the content is embodied, the access pattern being based on an order in which the one application accesses different parts of the content; and means for transferring the content, from the means for storing to the one application, contingent upon a positive result of the validating.

* * * * *

UNITED STATES PATENT AND TRADEMARK OFFICE
CERTIFICATE OF CORRECTION

| | | |
|---|---|---|
| PATENT NO. | : 8,181,255 B2 | Page 1 of 1 |
| APPLICATION NO. | : 10/592650 | |
| DATED | : May 15, 2012 | |
| INVENTOR(S) | : Bogot et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1602 days.

Signed and Sealed this
Eleventh Day of December, 2012

David J. Kappos
*Director of the United States Patent and Trademark Office*